United States Patent [19]

Mayne et al.

[11] 4,217,142

[45] * Aug. 12, 1980

[54] METAL COATING COMPOSITIONS

[75] Inventors: John E. O. Mayne, Cambridge; Peter J. Heyes, Barnsley, both of England

[73] Assignee: National Research Development Corporation, London, England

[*] Notice: The portion of the term of this patent subsequent to Jan. 23, 1996, has been disclaimed.

[21] Appl. No.: 907,015

[22] Filed: May 17, 1978

Related U.S. Application Data

[63] Continuation of Ser. No. 714,397, Aug. 16, 1978.

[30] Foreign Application Priority Data

Aug. 29, 1975 [GB] United Kingdom ............... 35718/75

[51] Int. Cl.$^2$ ................................................ C09D 5/08
[52] U.S. Cl. .................................. 106/14.36; 106/243; 252/389 R
[58] Field of Search ............... 106/14.23, 14.28, 14.36, 106/243; 21/2.7 R; 252/389 R, 39; 427/156, 327

[56] References Cited

U.S. PATENT DOCUMENTS

| | | | |
|---|---|---|---|
| 2,671,758 | 3/1954 | Vinograd | 252/18 |
| 2,726,215 | 12/1955 | Jones | 252/389 |
| 3,028,247 | 4/1962 | Molnar | 106/35 |
| 3,035,005 | 5/1962 | Sampson | 260/31.8 |

*Primary Examiner*—Hosea E. Taylor
*Assistant Examiner*—Amelia B. Yarbrough
*Attorney, Agent, or Firm*—Oblon, Fisher, Spivak, McClelland & Maier

[57] ABSTRACT

The use of magnesium azelate as a new rusting inhibitor in metal paints is described. The preferred inhibitor is a mixture of magnesium azelate and a basic oxide e.g. magnesium oxide in the proportion of 3:1 to 10:1 by weight. The new formulations are substitutes for lead oxide or zinc chromate primers and confer excellent protection on iron and steel.

12 Claims, No Drawings

METAL COATING COMPOSITIONS

This is a continuation, of application Ser. No. 714,397 filed Aug. 16, 1978.

This invention relates to protective coatings and more particularly to coating compositions for the protection of metal surfaces.

The invention will be introduced with reference to the protection of iron and steel against corrosion, but it has broader application to other metallic substrates as will appear hereinafter. The rusting of iron is a very well understood process and the protection of this metal against rusting by the application of coating compositions containing red lead has a long history. Red lead pigment in a conventional drying oil vehicle is well known to confer excellent protection by a mechanism involving degradation of compounds formed between the lead oxide and the fatty acid components of the drying oil. These compounds, the lead soaps, degrade in the presence of water and oxygen to yield a variety of compounds which are inhibitive, the most important being lead azelate. Lead azelate is continually formed by the breaking down of unsaturated fatty acids present in, for example, the linseed oil vehicle and the resulting lead azelate and other compounds inhibit rust formation by blocking weaknesses in the naturally occurring oxide film on the iron surface.

The knowledge of the protective mechanism described above has prompted proposals to use various azelates as pigments. Surprisingly, however, when lead azelate, calcium azelate and zinc azelate are formulated in inert vehicles (different from the conventional drying oils), results have been largely unsuccessful.

It has now been found that magnesium azelate has excellent inhibitive properties and the present invention, therefore comprises a protective coating composition containing inhibitive amounts of magnesium azelate.

The amount of magnesium azelate in the coating composition required to produce an acceptable level of inhibition may be readily detected by experiments with the particular metal for which protection is required. For example, for the protection of iron and steel coating compositions calculated to deposit from about 1% to about 10% by weight of magnesium azelate based on the weight of the dry film are highly effective. In practice proportions of at least 2% by weight and preferably from about 4% to about 6% by weight are recommended. Conveniently the composition may be in the form of a base preparation requiring dilution as appropriate at the time of use.

Preferably magnesium azelate is used in conjunction with a basic metal oxide e.g. an alkaline earth metal oxide which acts to raise the pH of the environment between the dried coating and the underlying metal which is created when water penetrates through the protective layer. Magnesium oxide is a good example of such an added material. Combinations of magnesium azelate and magnesium oxide in the proportions of from about 3:1 to about 10:1 give excellent results.

The coating compositions of the present invention may be oil-based or water-based. Thus, the inhibitor may be present in conventional drying oils or any of the more recently developed synthetic film-forming polymers and copolymers which are now in current use in paint technology. Magnesium azelate may also be used in the so-called emulsion paints which are aqueous emulsions or colloidal solutions of drying oils, modified drying oils, or suitable polymeric compositions, or any mixture thereof; with these the inhibitor is present in solution and may also be present in suspension. Particularly in the oil-based paints, magnesium azelate confers the additional advantages of body and structure and ready dispersibility on the composition.

The invention is of especial importance in protective coating compositions which are lead free, the use of lead bearing compositions being at present in disfavour except under closely controlled conditions. Various chromates e.g. zinc chromate are currently available as alternatives to red lead (although they function by a different mechanism), but these are also subject to criticism and the present invention has particular application to compositions which are also free of such chromates.

The present invention also includes a process for the protection of a metal surface which comprises applying to the surface a coating containing magnesium azelate.

The invention may be used for the protection of a variety of metals and alloys including iron and steel, dural, aluminium, zinc and others. The compositions of the invention are essentially priming paints for metal surfaces and preferably require the subsequent application of adherent layers of highly impermeable film-forming materials. However, they are very persistent on, and effective on, surfaces which remain non-top-coated for some considerable time which, in view of the relatively high water-solubility of magnesium azelate, is remarkable. Results obtained so far for the protection of mild steel indicate a high level of inhibition comparable with that obtained with red lead and at least as good as that obtained with zinc chromate and zinc phosphate.

Typical coating compositions in accordance with the invention are described in the following Examples in which all parts are given by weight.

In the Examples, the following film forming compositions were employed:

Beckalide 5065 is a 65% solution of a polyamide resin having an amine number of about 140 to 150; and acid value of less than 7; and a specific gravity of 0.924 in a xylene-isopropanol mixture.

Beckurane 79–60 is a polyurethane oil having a Gardner viscosity of $z-z_2$; a Gardner color of 6; an acid number of less than 0.5; a specific gravity of 0.960; a free NCO content of 0.0%, which is the reaction product of diiocyanate with a material having a reactive hydrogen atom.

Epikote 1001 is an epoxide resin which melts at from 64°–76° C.; has a viscosity of 0.8 to 1.7 poises at 25° C.; an epoxide equivalent of from about 450–525; an equivalent weight of 130; and an average molecular weight of 900.

Styrenated Alkyd Scopol 51 NX is a styrene modified alkyd having a styrene content of approximately 16%; a phthalic acid content of approximately 30.5%; and 46% of mixed, non-yellowing fatty acid oils which have been esterified with glycerol and xylene as the solvent. The total non-volatile content is about 70, ±1%.

Versamid 115 is a reactive polyamide resin with a conventional coating curing agent having a maximum acid value of 4, and a viscosity of 500–600 poises at 40° C.

Vinacryl 7175 is an anti-corrosive metal primer which is an aqueous emulsion of a styrene-acrylic copolymer, having a non-volatile content of 50%, a viscosity of 0.2 to 0.5 poises at 25° C., a pH of from 6.5 to 7.0, containing an anionic emulsifier.

EXAMPLE 1

| | |
|---|---|
| Vinacryl 7175 Styrene-acrylate aqueous emulsion (50% solids) | 849 |
| TiO₂ | 40.7 |
| Magnesium azelate | 42.2 |
| Suspending agent (Modocoll E600) | 0.6 |
| Dispersing agent (Calgon S) | 1.2 |
| 880 Ammonia | 12 |
| Preservative | 0.4 |
| Water | 46 |

The above composition has been applied to mild steel test panels in an industrial exposure site in South London. After 18 months the condition of the paint film is still excellent even though not top coated. The test panels compare favourably with control panels treated with emulsion based zinc chromate.

EXAMPLE 2

| | |
|---|---|
| Polyurethane alkyd oil (Beckurane 79-60) | 85 |
| Cobalt naphthenate (6% cobalt in white spirit) | 0.4 |
| Magnesium azelate | 15 |
| Solvent (White Spirit) | 50 |

EXAMPLE 3

| | |
|---|---|
| Polyurethane alkyd oil (Beckurane 79-60) | 85 |
| Cobalt naphthenate (6% cobalt in white spirit) | 0.4 |
| Magnesium azelate | 12 |
| Magnesium oxide | 3 |
| White Spirit | 50 |

EXAMPLE 4

| | |
|---|---|
| Polyurethane alkyd oil (Beckurane 79-60) | 85 |
| Cobalt naphthenate (6% cobalt in white spirit) | 0.4 |
| Magnesium azelate | 13.5 |
| Magnesium oxide | 1.5 |
| White Spirit | 50 |

EXAMPLE 5

| | |
|---|---|
| Epikote 1001 (70% solution in xylene-butanol 3:1) | 49 |
| Beckalide 5065 (65% solution in xylene-butanol 3:1) | 36 |
| Magnesium azelate | 15 |
| Xylene | 30 |
| Butanol | 10 |

EXAMPLE 6

| | |
|---|---|
| Epikote 1001 (70% solution in xylene-butanol 3:1) | 49 |
| Beckelide 5065 (65% solution in xylene butanol 3:1) | 36 |
| Magnesium azelate | 13.5 |
| Magnesium oxide | 1.5 |
| Xylene | 30 |
| Butanol | 10 |

EXAMPLE 7

Primer formulations are made up as follows including a standard zinc chromate primer and primers A and B according to the invention. Figures represent grams weight.

TABLE

| | Control | Primer A | Primer B |
|---|---|---|---|
| Red Iron Oxide ED9 | 47.25 | 47.25 | 47.25 |
| Zinc Potassium Chromate | 10.12 | — | — |
| Magnesium Azelate | — | 4.23 | 6.35 |
| Magnesium Oxide | — | 1.06 | 1.60 |
| Celite 281 | 6.75 | 6.75 | 3.30 |
| China Clay | 3.37 | 3.37 | 3.38 |
| Styrenated Alkyd Scopol 51NX (70% solids) | 37.70 | 37.70 | 37.70 |
| Calcium Naphthenate 5% | 1.30 | 1.30 | 1.30 |
| Cobalt Naphthenate 5% | 0.2 | 0.22 | 0.22 |
| MEK Oxime | 0.20 | 0.26 | 0.26 |
| Xylene | as required | as required | as required |
| PVC | 39% | 39% | 39% |
| Active pigment | 7.02% by volume on solids | 7.02% by volume on solids | 10.5% by volume on solids |
| | 10.8% by weight | 6.0% by weight | 9.07% by weight |

The above panels have been subjected to conventional tests including
 (1) salt spray (REL cabinet 3% sodium chloride solution)
 (2) sulphur dioxide/humidity (British Standard 3900 Part F8)
 (3) humidity cabinet (British Standard 3900 Part F2).

After 250 hours exposure in the salt spray test the control panels show general low intensity rust spotting whereas with primer A few rust stains appear and with primer B there is a greatly reduced intensity of attack. In the sulphur dioxide/humidity test the control panels after 7 cycles are in poor condition with moderate to severe rust spotting and streaking. Panels treated with primer A show very light spotting confined to the panel edges. The primer B panels are in good condition. In the humidity cabinet test after 1000 hours panels treated with primers A and B are clearly in superior condition to those in the control. The primer B panels are in particularly good condition throughout.

EXAMPLE 8

Primer formulations are made up as follows including a standard strontium chromate primer and primers C and D according to the invention. Figures represent grams weight.

TABLE

| | Control | Primer C | Primer D |
|---|---|---|---|
| Titanium Dioxide Anatase E | 21.5 | 21.5 | 21.5 |
| Micronised Asbestine | 54.0 | 54.0 | 34.5 |
| Celite 281 | 33.0 | 33.0 | 21.5 |
| Strontium Chromate | 85.5 | — | — |
| Magnesium azelate | — | 36.0 | 54.0 |
| Magnesium oxide | — | 4.0 | 6.0 |
| Epikote 1001 | 40% solution 211.0 | 40% solution 211.0 | 40% solution 211.0 |
| Thinners | (1/1/1 by weight xylene, n butyl alcohol and methyl ethyl ketone) | | |
| | as required | as required | as required |
| Activator Versamid 115 | 30% solution | 30% solution | 30% solution |
| Mixing ratio | 100 base/ 33.4 acti- | 100 base/ 39.2 acti- | 100 base/ 40.4 acti- |

TABLE-continued

| | Control | Primer C | Primer D |
|---|---|---|---|
| | vator. | vator. | vator. |
| PVC | 34.9% | 34.9% | 34.97% |
| Active pigment | 13.2% by volume on solids | 13.2% by volume on solids | 19.8% by volume on solids |
| | 26.7% by weight on solids | 14.6% by weight | 22.7% by weight |

Magnesium azelate may also be used in other ways to protect metals against corrosion e.g. as an additive in water systems of various kinds.

We claim:

1. In a protective coating composition which protects metal surfaces against corrosion and comprises a film forming vehicle and corrosion inhibitor, the improvement comprising magnesium azelate as said corrosion inhibitor in an effective amount.

2. The protective coating composition of claim 1, wherein the quantity of magnesium azelate in said composition is sufficient to provide a dry film containing at least 1 wt.% magnesium azelate.

3. The protective coating composition of claim 1 in which the proportion of magnesium azelate is such as to deposit from about 1% to about 10% by weight of the dry film.

4. The protective coating composition of claim 3 in which the proportion of magnesium azelate is such as to deposit from 4 to 6% by weight.

5. The protective coating composition of claim 2 wherein an alkaline earth metal oxide is present.

6. The protective coating composition of claim 5 wherein the alkaline earth metal oxide is magnesium oxide.

7. The protective coating composition of claim 5 wherein the proportion of magnesium azelate to alkaline earth metal oxide is in the range from 3:1 to 10:1 by weight.

8. The protective coating composition of claim 7 in which the proportion of magnesium azelate to alkaline earth metal oxide is about 4:1.

9. The protective coating composition of claim 1 which is free of lead.

10. In a method for protecting a metal surface from corrosion by applying to said surface an adherent coating composition containing a film forming vehicle and an effective amount of a corrosion inhibitor, the improvement comprising magnesium azelate as said corrosion inhibitor.

11. The method of claim 10, wherein said coating composition contains sufficient magnesium azelate to provide a dried film containing at least 1 wt.% magnesium azelate.

12. The process of claim 10 wherein the metal is iron or steel.

* * * * *

UNITED STATES PATENT AND TRADEMARK OFFICE
CERTIFICATE OF CORRECTION

PATENT NO. : 4,217,142
DATED : Aug. 12, 1980
INVENTOR(S) : JOHN E.O. MAYNE ET AL

It is certified that error appears in the above-identified patent and that said Letters Patent are hereby corrected as shown below:

Related U.S. Application Data

[63] Continuation of Ser. No. 714,397, Aug. 16, 1976.

Signed and Sealed this

Twenty-eighth Day of October 1980

[SEAL]

Attest:

SIDNEY A. DIAMOND

Attesting Officer

Commissioner of Patents and Trademarks